United States Patent
Cattoor et al.

(10) Patent No.: US 11,287,016 B2
(45) Date of Patent: Mar. 29, 2022

(54) MULTI-GEAR TRANSMISSION LAYOUT

(71) Applicant: DANA BELGIUM N.V., Bruges (BE)

(72) Inventors: Kurt D. M. Cattoor, Bruges (BE); Filip D. Schacht, Meulebeke (BE)

(73) Assignee: Dana Belgium N.V., Bruges (BE)

( * ) Notice: Subject to any disclaimer, the term of this patent is extended or adjusted under 35 U.S.C. 154(b) by 877 days.

(21) Appl. No.: 16/081,054

(22) PCT Filed: Mar. 3, 2017

(86) PCT No.: PCT/EP2017/055057
§ 371 (c)(1),
(2) Date: Aug. 30, 2018

(87) PCT Pub. No.: WO2017/149141
PCT Pub. Date: Sep. 8, 2017

(65) Prior Publication Data
US 2019/0063557 A1    Feb. 28, 2019

Related U.S. Application Data

(60) Provisional application No. 62/303,265, filed on Mar. 3, 2016.

(51) Int. Cl.
*F16H 3/093*    (2006.01)
*F16H 3/00*    (2006.01)

(52) U.S. Cl.
CPC ....... *F16H 3/093* (2013.01); *F16H 2200/006* (2013.01); *F16H 2200/2035* (2013.01)

(58) Field of Classification Search
CPC ............... F16H 3/093; F16H 2200/006; F16H 2200/2035; F16H 3/006
(Continued)

(56) References Cited

U.S. PATENT DOCUMENTS

| 5,249,475 A | 10/1993 | McAskill |
| 6,190,280 B1 | 2/2001 | Horsch |

(Continued)

FOREIGN PATENT DOCUMENTS

| CN | 101858407 | 10/2010 |
| CN | 101886697 | 11/2010 |

(Continued)

OTHER PUBLICATIONS

European Patent Office, International Search Report with Written Opinion issued in PCT/EP2017/055057, dated May 16, 2017, 17 pages, European Patent Office, Rijswijk, Netherlands.

(Continued)

*Primary Examiner* — Ha Dinh Ho
(74) *Attorney, Agent, or Firm* — Marshall & Melhorn, LLC

(57) ABSTRACT

Described is a transmission including an input direction assembly, a first clutching assembly, a second clutching assembly, a first range clutching assembly, a second range clutching assembly and a housing. The input and direction selection assembly includes an input shaft, a first direction selection clutch assembly, a second direction selection clutch assembly and a reversing gear in driving engagement with the second direction selection clutch assembly and the input shaft. The first clutching assembly is selectively drivingly engaged with the input and direction selection assembly and the first range clutching assembly. The second clutching assembly is selectively drivingly engaged with the input and direction selection assembly. The first range clutching assembly is selectively drivingly engaged with the second clutching assembly and the second range clutching assembly.

20 Claims, 5 Drawing Sheets

(58) Field of Classification Search
USPC .................................................. 74/330, 331
See application file for complete search history.

(56) References Cited

U.S. PATENT DOCUMENTS

| | | | |
|---|---|---|---|
| 6,209,406 B1 | 4/2001 | Sperber | |
| 6,655,488 B2 | 12/2003 | Braud | |
| 7,191,676 B2 | 3/2007 | Abramov | |
| 7,611,004 B2 | 11/2009 | DeRoo et al. | |
| 8,887,589 B2* | 11/2014 | Ibamoto | F16H 3/08 74/331 |
| 9,003,905 B1* | 4/2015 | Lee | F16H 3/093 74/330 |
| 9,021,906 B2* | 5/2015 | Dreibholz | F16H 3/006 74/330 |
| 2005/0252325 A1 | 11/2005 | Stevenson | |
| 2006/0169077 A1 | 8/2006 | Gitt | |
| 2015/0112560 A1 | 4/2015 | Bremner | |
| 2015/0119183 A1* | 4/2015 | Kwon | F16H 3/093 475/207 |
| 2015/0167786 A1* | 6/2015 | Kim | F16H 3/093 74/330 |
| 2015/0267778 A1 | 9/2015 | Peterson et al. | |
| 2016/0076626 A1 | 3/2016 | Hose et al. | |
| 2016/0298315 A1 | 10/2016 | Miyamoto et al. | |

FOREIGN PATENT DOCUMENTS

| | | |
|---|---|---|
| CN | 101893067 | 11/2010 |
| WO | 2005021999 A1 | 3/2005 |

OTHER PUBLICATIONS

China National Intellectual Property Administration, Office Action in Application No. 201780014390.X, dated May 21, 2021, 11 pages.

* cited by examiner

MULTI-GEAR TRANSMISSION LAYOUT

RELATED APPLICATION

The present application claims priority to and the benefit from Provisional U.S. Patent Application Ser. No. 62/303,265 filed on Mar. 3, 2016. The content of the above-noted patent application is hereby expressly incorporated by reference into the detailed description of the present application.

FIELD

The present invention relates to a multi-gear transmission for a power train of a motor vehicle.

BACKGROUND

Multi-speed transmissions having countershafts are widely used in the power train arrangements because a plurality of rotating clutch assemblies and associated gears can be positioned on parallel shafts to allow considerable flexibility and compact packing. However, as the number of clutches and gears increases with added gear selections and the requirements of the application so does the cost and complexity.

It would be advantageous to develop a transmission layout that is compact and allows for a wide range of gear and speed ratios while reducing the load of the transmission.

SUMMARY

Provided herein, is a transmission including an input direction assembly, a first clutching assembly, a second clutching assembly, a first range clutching assembly, a second range clutching assembly and a housing. The input and direction selection assembly includes an input shaft, a first direction selection clutch assembly having a clutch and a geared output portion, a second direction selection clutch assembly having a clutch, and a reversing gear in driving engagement with the second direction selection clutch and the input shaft. The first direction selection clutch selectively engages the input shaft and the geared output portion of the first direction selection clutch assembly and the second direction selection clutch selectively engages the geared output of the first direction selection clutch assembly and the reversing gear. The first clutching assembly includes an input portion, a first gear selection portion and second gear selection portion. The second clutching assembly includes an input portion, a third gear selection portion and a fourth gear selection portion. The first range clutching assembly includes a geared input portion and a range selection portion. The second range clutching assembly includes an output shaft portion and a range selection portion. The first clutching assembly is selectively drivingly engaged with the input and direction selection assembly and the first range clutching assembly. The second clutching assembly is selectively drivingly engaged with the input and direction selection assembly through the geared output portion. The first range clutching assembly is selectively drivingly engaged with the second clutching assembly and the second range clutching assembly.

Provided herein, is a transmission including an input direction assembly, a first clutching assembly, a second clutching assembly, a first range clutching assembly, a second range clutching assembly and a housing. The input and direction selection assembly include an input shaft, a first direction selection clutch assembly having a clutch and a geared output portion, and a second direction selection clutch assembly having a clutch. The first direction selection clutch selectively engages the input shaft and the geared output portion and the second direction selection clutch selectively engages the input shaft. The first clutching assembly including an input portion, a first gear selection portion and a second gear selection portion. The second clutching assembly including an input portion, a third gear selection portion and a fourth gear selection portion. The first range clutching assembly including a geared input portion and a range selection portion. The second range clutching assembly including an output shaft portion and a range selection portion. The first clutching assembly is selectively drivingly engaged with the input and direction selection assembly through the geared output portion and the second clutching assembly. The second clutching assembly is selectively drivingly engaged with the input and direction selection assembly. The first range clutching assembly is selectively drivingly engaged with the first clutching assembly, the second clutching assembly and the second range clutching assembly.

Provided herein, is a transmission including an input direction assembly, a first clutching assembly, a second clutching assembly, a first range clutching assembly, a second range clutching assembly, an idler shaft and a housing. The input and direction selection assembly including an input shaft, a first direction selection clutch assembly having a clutch and a geared output portion, and a second direction selection clutch assembly having a clutch. The first clutching assembly including an input portion, a first gear selection portion and a second gear selection portion. The second clutching assembly including an input portion, a third gear selection portion and a fourth gear selection portion. The first range clutching assembly including a geared input portion and a range selection portion. The second range clutching assembly including an output shaft portion and a range selection portion. The first direction selection clutch selectively engages the input shaft and the first clutching assembly. The second direction selection clutch selectively engages the input shaft and the first clutching assembly through the idler shaft. The first clutching assembly is selectively drivingly engaged with the first range clutching assembly. The first range clutching assembly is selectively drivingly engaged with the second clutching assembly and the second range clutching assembly.

BRIEF DESCRIPTION OF THE FIGURES

The above, as well as other advantages of the present embodiments, will become readily apparent to those skilled in the art from the following detailed description when considered in the light of the accompanying drawings in which.

DETAILED DESCRIPTION

It is to be understood that the invention may assume various alternative orientations and step sequences, except where expressly specified to the contrary. It is also to be understood that the specific devices and processes illustrated in the attached drawings, and described in the following specification are simply exemplary embodiments of the inventive concepts defined herein. Hence, specific dimensions, directions or other physical characteristics relating to the embodiments disclosed are not to be considered as limiting, unless the claims expressly state otherwise.

Figure 1:
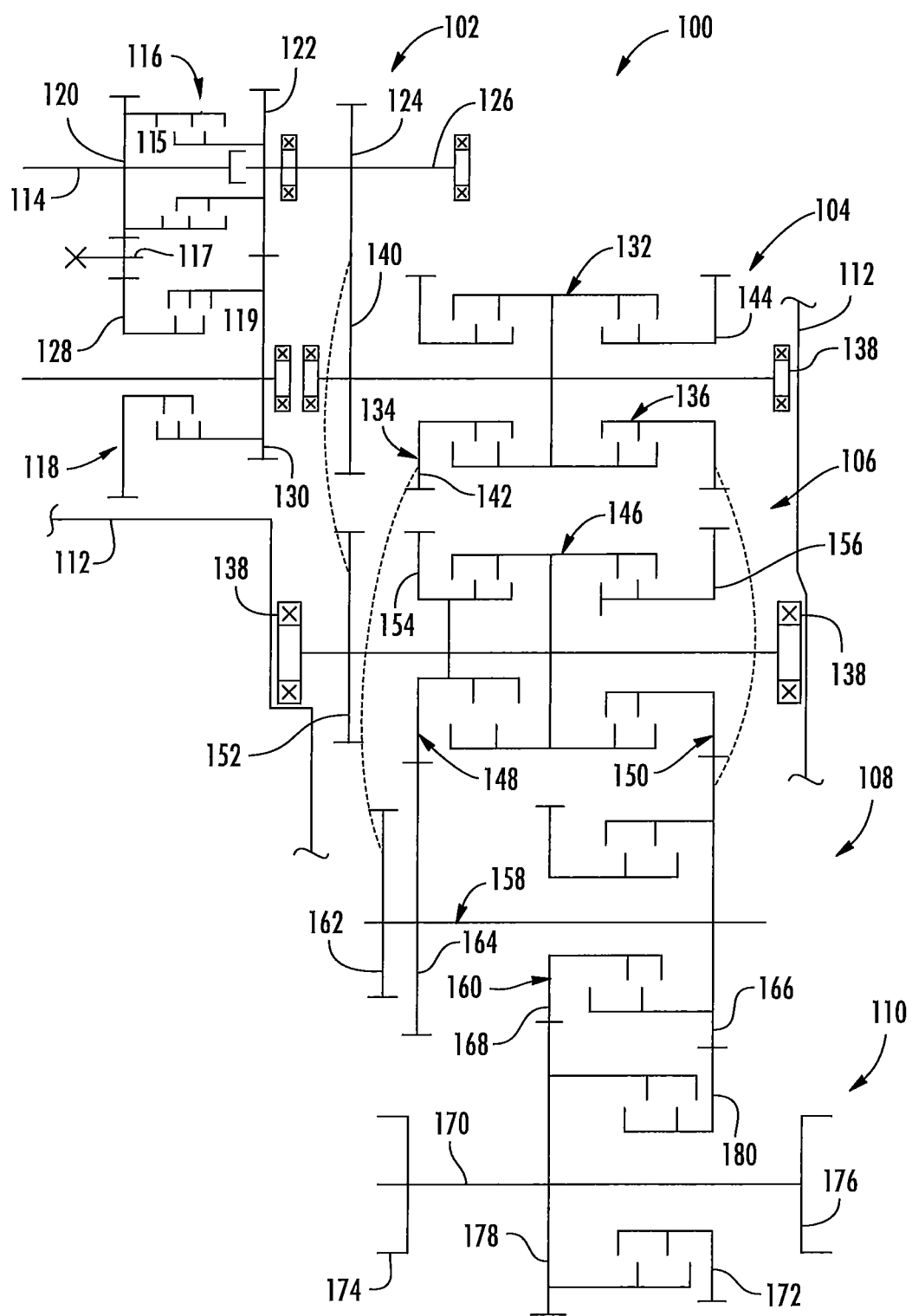
FIG. 1 is a schematic view of another preferred embodiment of a transmission.

FIG. 1 illustrates a transmission 100 according to a preferred embodiment. The transmission 100 may be used with a vehicle designed for primary use in off-road situations, but it is understood that the transmission 100 may also be used in other applications. The transmission 100 includes an input and direction selection assembly 102, a first clutching assembly 104, a second clutching assembly 106, a first range clutching assembly 108, and a second range clutching assembly 110. The input and direction selection assembly 102, the first clutching assembly 104, the second clutching assembly 106, the first range clutching assembly 108, and the second range clutching assembly 110 are rotatably disposed within a transmission housing 112 (partially shown).

The transmission housing 112 is preferably provided with mounting locations suitable for additional elements including, but not limited to, a torque converter assembly. A torque converter assembly (not shown) may be coupled to the transmission housing 112 and is in driving engagement with an input shaft 114 of the input and direction selection assembly 102.

The input and direction selection assembly 102 is a clutch and gear assembly drivingly engaged with the torque converter assembly or another power source and the first clutching assembly 104. The input and direction selection assembly 102 includes the input shaft 114, a first direction selection clutch assembly 116, a reversing gear 117, and a second direction selection clutch assembly 118.

The input shaft 114 is a shaft rotatably mounted in the transmission housing 112 through the use of at least a pair of bearings (not shown) has a geared radially extending portion 120 mounted thereon and is drivingly engaged with a portion of the first direction selection clutch assembly 116. The geared radially extending portion 120 is drivingly engaged with the second direction selection clutch assembly 118.

The first direction selection clutch assembly 116 includes a clutch 115 a geared radially extending portion 122 and a geared radially extending output portion 124 mounted on a rotatable shaft 126. The first direction selection clutch 115 as shown in FIG. 1 is a plate style clutch, however, it is understood that the first direction selection clutch 115 may be any type of clutch that may be variably engaged.

By engaging the first direction selection clutch 115, the input shaft 114 becomes drivingly engaged with a remaining portion of the first direction selection clutch assembly 116. The geared radially extending portion 122 is in driving engagement with the second direction selection clutch assembly 118 and the geared radially extending output portion 124 is in driving engagement with the first clutching assembly 104. As a non-limiting example, the first direction selection clutch assembly 116 may be configured as a "forward" selection clutch.

The second direction selection clutch assembly 118 includes a clutch 119, an input portion 128 and a rotatably mounted output portion 130. The second direction selection clutch 119, as shown in FIG. 1, is a plate style clutch, however, it is understood that the second direction selection clutch 119 may be any type of clutch that may be variably engaged. By engaging the second direction selection clutch 119, the input shaft 114 becomes drivingly engaged with the input portion 128 of the second direction selection clutch assembly 118. The output portion 130 of the second direction selection clutch assembly 118 is drivingly engaged with the geared radially extending portion 122 and, thus, the first clutching assembly 104 through the geared radially extending output portion 124. As a non-limiting example, the second direction selection clutch assembly 118 may be configured as a "reverse" selection clutch.

The first clutching assembly 104 is a clutch and gear assembly is selectively drivingly engaged with the input and direction selection assembly 102 and the first range clutching assembly 108. The first clutching assembly 104 includes an input portion 132, a first gear selection portion 134, and a second gear selection portion 136.

The input portion 132 is a shaft rotatably mounted in the transmission housing 112 through the use of at least a pair of bearings 138 and includes a geared radially extending portion 140, a portion of the first gear selection portion 134, and a portion of the second gear selection portion 136. The geared radially extending portion 140 is drivingly engaged with the geared radially extending output portion 124.

The first gear selection portion 134 is a plate style clutch and gear assembly, however, it is understood that the first gear selection portion 134 may be any type of clutch that may be variably engaged. By engaging the first gear selection portion 134, the input portion 132 becomes drivingly engaged with an output portion 142 of the first gear selection portion 134 and, thus, the rotatable shaft 126 becomes drivingly engaged with the first range clutching assembly 108 through the output portion 142. The output portion 142 of the first gear selection portion 134 is drivingly engaged with a portion of the first range clutching assembly 108. As a non-limiting example, the first gear selection portion 134 may be configured as a "speed" selection clutch.

The second gear selection portion 136 is a plate style clutch and gear assembly, however, it is understood that the second gear selection portion 136 may be any type of clutch that may be variably engaged. By engaging the second gear selection portion 136, the input portion 132 becomes drivingly engaged with an output portion 144 of the second gear selection portion 136 and, thus, the rotatable shaft 126 becomes drivingly engaged with the first range clutching assembly 108 through the output portion 144. The output portion 144 of the second gear selection portion 136 is drivingly engaged with a portion of the first range clutching assembly 108. As a non-limiting example, the second gear selection portion 136 may be configured as a "speed" selection clutch.

The reversing gear 117 is a gear rotatably mounted in the transmission housing 112 through the use of at least a pair of bearings (not shown). The reversing gear 117 is drivingly engaged with the geared radially extending portion 120 and the input portion 128. The reversing gear 117 changes a direction of rotation between the geared radially extending portion 120 and the input portion 128 so that when the second direction selection clutch assembly 118 is engaged, a direction of rotation at the geared radially extending portion 122 is reversed.

The second clutching assembly 106 is a clutch and gear assembly selectively drivingly engaged with the input and direction selection assembly 102 and the first range clutching assembly 108. The second clutching assembly 106 includes an input portion 146, a third gear selection portion 148 and a fourth gear selection portion 150.

The input portion 146 is a shaft rotatably mounted in the transmission housing 112 through the use of at least a pair of bearings 138 and includes a geared radially extending portion 152, a portion of the third gear selection portion 148, and a portion of the fourth gear selection portion 150. The geared radially extending portion 152 is drivingly engaged with the geared radially extending output portion 124.

The third gear selection portion 148 is a plate style clutch and gear assembly, however, it is understood that the third gear selection portion 148 may be any type of clutch that may be variably engaged. By engaging the third gear selection portion 148, the input portion 146 becomes drivingly engaged with an output portion 154 of the third gear selection portion 148 and, thus, the rotatable shaft 126 becomes drivingly engaged with the first range clutching assembly 108 through the output portion 154. The output portion 154 of the third gear selection portion 148 is drivingly engaged with a portion of the first range clutching assembly 108. As a non-limiting example, the third gear selection portion 148 may be configured as a "speed" selection clutch.

The fourth gear selection portion 150 is a plate style clutch and gear assembly, however, it is understood that the fourth gear selection portion 150 may be any type of clutch that may be variably engaged. By engaging the fourth gear selection portion 150, the input portion 146 becomes drivingly engaged with an output portion 156 of the fourth gear selection portion 150 and, thus, the rotatable shaft 126 becomes drivingly engaged with the first range clutching assembly 108 through the output portion 156. The output portion 156 of the fourth gear selection portion 150 is drivingly engaged with a portion of the first range clutching assembly 108. As a non-limiting example, the fourth gear selection portion 150 may be configured as a "speed" selection clutch.

The first range clutching assembly 108 is a clutch and gear assembly drivingly engaged with the first clutching assembly 104, the second clutching assembly 106, and the second range clutching assembly 110. The first range clutching assembly 108 includes a geared input portion 158 and a range selection portion 160. The range selection portion 160 is disposed about the geared input portion 158.

The geared input portion 158 is a shaft rotatably mounted in the transmission housing 112 through the use of at least a pair of bearings (not shown) and includes a first input gear 162, a second input gear 164, and a third input gear 166. The first input gear 162 and the second input gear 164 are disposed adjacent a first end of the geared input portion 158 and the third input portion 166 is disposed adjacent a second end of the geared input portion 158. The first input gear 162 is drivingly engaged with the output portion 142 of the first gear selection portion 134. The second input gear 164 is drivingly engaged with the output portion 154 of the third gear selection portion 148. The third input gear 166 is drivingly engaged with the output portion 156 of the fourth gear selection portion 150, the output portion 144 of the second gear selection portion 136, and a portion of the second range clutching assembly 110.

The range selection portion 160 is a plate style clutch and gear assembly, however, it is understood that the range selection portion 160 may be any type of clutch that may be variably engaged. By engaging the range selection portion 160, the geared input portion 158 becomes drivingly engaged with an output portion 168 of the range selection portion 160 and, thus, the rotatable shaft 126 becomes drivingly engaged with the first range clutching assembly 108 through one of the first clutching assembly 104 and the second clutching assembly 106, depending on an engagement thereof. The output portion 168 of the range selection portion 160 is drivingly engaged with a portion of the second range clutching assembly 110. As a non-limiting example, the range selection portion 160 may be configured as a "range" selection clutch, such as a "low range" selection clutch.

The second range clutching assembly 110 is a clutch and gear assembly drivingly engaged with the output portion 168 and the third input gear 166 of the first range clutching assembly 108. The second range clutching assembly 110 includes an output shaft portion 170 and a range selection portion 172. The range selection portion 160 is disposed about the output shaft portion 170.

The output shaft portion 170 is a shaft rotatably mounted in the transmission housing 112 through the use of at least a pair of bearings (not shown) and includes a first output end 174, a second output end 176, and an input gear portion 178. As a non-limiting example, the first output end 174 and the second output end 176 may be configured to be coupled to a driveshaft (not shown). Further, it is understood that the output shaft portion 170 may only include one of the output ends 174, 176. The input gear portion 178 is a geared, radially extending portion that is drivingly engaged with the output portion 168 of the range selection portion 160. The input gear portion 178 is also drivingly engaged with a portion of the range selection portion 172.

The range selection portion 172 is a plate style clutch and gear assembly, however, it is understood that the range selection portion 172 may be any type of clutch that may be variably engaged. By engaging the range selection portion 172, a geared input portion 180 becomes drivingly engaged with the third input gear 166 of the first range clutching assembly 108 and, thus, the rotatable shaft 126 becomes drivingly engaged with the second range clutching assembly 110 through one of the first clutching assembly 104 and the second clutching assembly 106, depending on an engagement thereof. The geared input portion 180 of the range selection portion 172 is drivingly engaged with a portion of the first range clutching assembly 108. As a non-limiting example, the range selection portion 172 may be configured as a "range" selection clutch, such as a "high range" selection clutch.

The transmission 100 is capable of transmitting torque from the input shaft 114 to the output outputs 174, 176. It is understood that a plurality of power-paths associated with the transmission 100 as defined by engaging a combination of one of the direction selection clutches 115, 119 one of the gear selection portions 134, 136, 148, 150, and one of the range selection portions 160, 172 may each have a different drive ratio. Those skilled in the art will readily understand that a different drive ratio is associated with a torque ratio.

Figure 2:
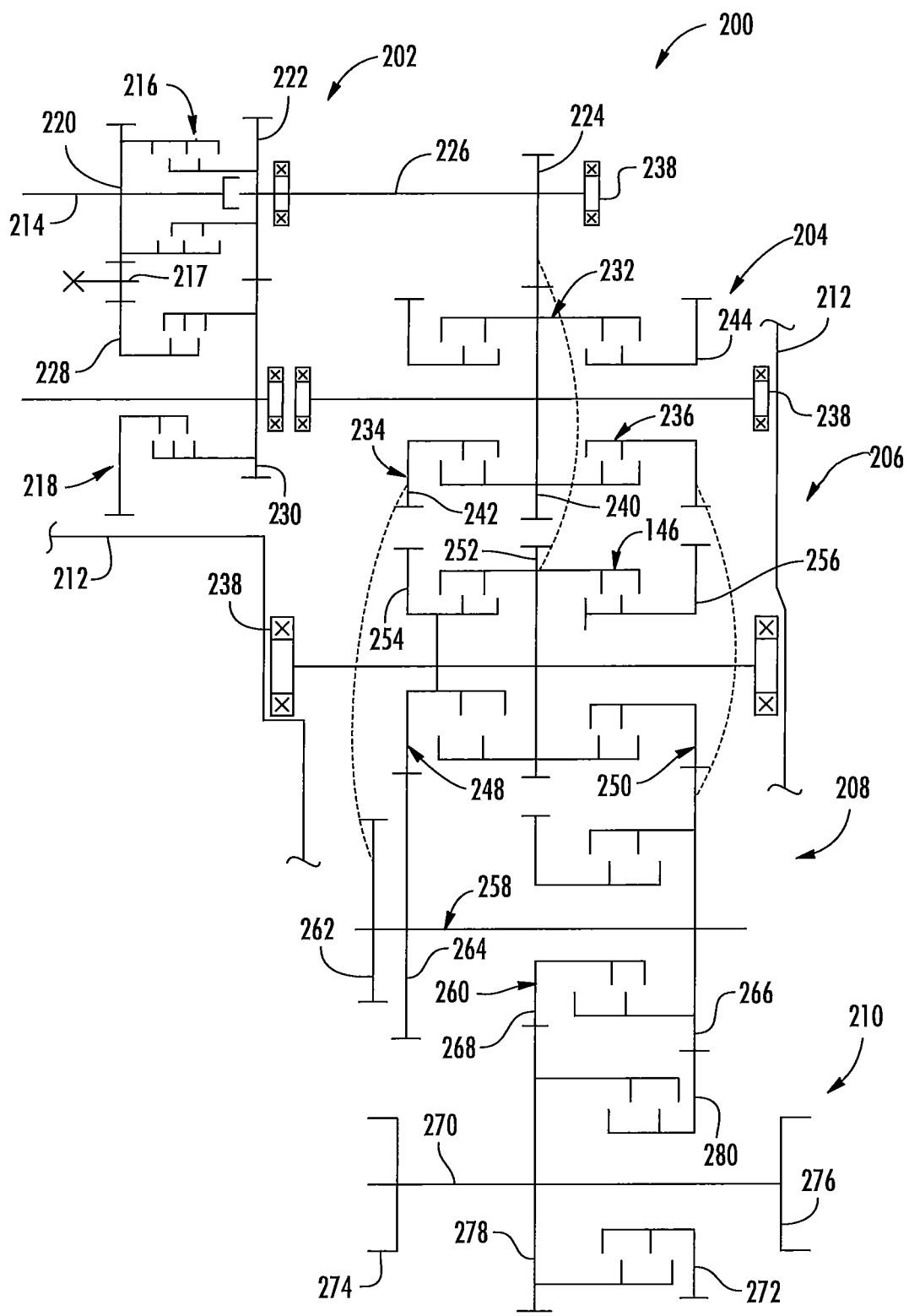
FIG. 2 is a schematic view of another preferred embodiment of a transmission.

FIG. 2 illustrates a transmission 200. The transmission 200 is a variation of the transmission 100, and has similar features thereto. The embodiment shown in FIG. 2 includes similar components to the transmission 100 illustrated in FIG. 1. Similar features of the variation shown in FIG. 2 are numbered similarly in series. Different and additional features of the variation shown in FIG. 2 can be appreciated by one skilled in the art in view of FIG. 2 and the transmission 100 illustrated in FIG. 1. The main difference between the variants of the layout for the transmission 200 is a position of the geared radially extending output portion 224 with respect to geared input portions 240, 252. As shown in FIG. 2, the geared radially extending output portion 224 is positioned axially between the gear selection portions 234, 236, 248, 250 of the first clutching assembly 204 and the second clutching assembly 206. Beside the differences described hereinabove, the layout of the transmissions shown in FIGS. 1 and 2 is the same.

In use, the transmission 100, 200 as described hereinabove include components that allow each of the transmissions 100, 200 to be placed in eight different speed selections, in addition to a direction selection (forward or reverse). Use of the first range clutching assembly 108, 208 and the second range clutching assembly 110, 210 can double the number of speeds selectable within the transmission 100, 200. The transmission 100, 200 provides several advantages, namely that use of the first range clutching assembly 108, 208 and the second range clutching assembly 110, 210 provides a large gear ratio spread, which allows a gear ratio spread provided by the gear selection portions 134, 136, 148, 150, 234, 236, 248, 250 to be reduced, allowing individual gear spreads between each of the gear selection portions 134, 136, 148, 150, 234, 236, 248, 250 to be more equal while also lowering operating speeds of the components of the transmission 100, 200. Accordingly, such benefits provide that more cost effective options may be selected for the bearings 138, 238 as the power loads applied thereto decreases.

Lastly, as a considerable amount of gear reduction is handled by the use of the first range clutching assembly 108, 208 and the second range clutching assembly 110, 210, the amount of torque applied to many of the components of the transmission 100, 200 is reduced, allowing the components to be of a smaller size while still capable of transmitting a similar amount of power therethrough.

Figure 3:
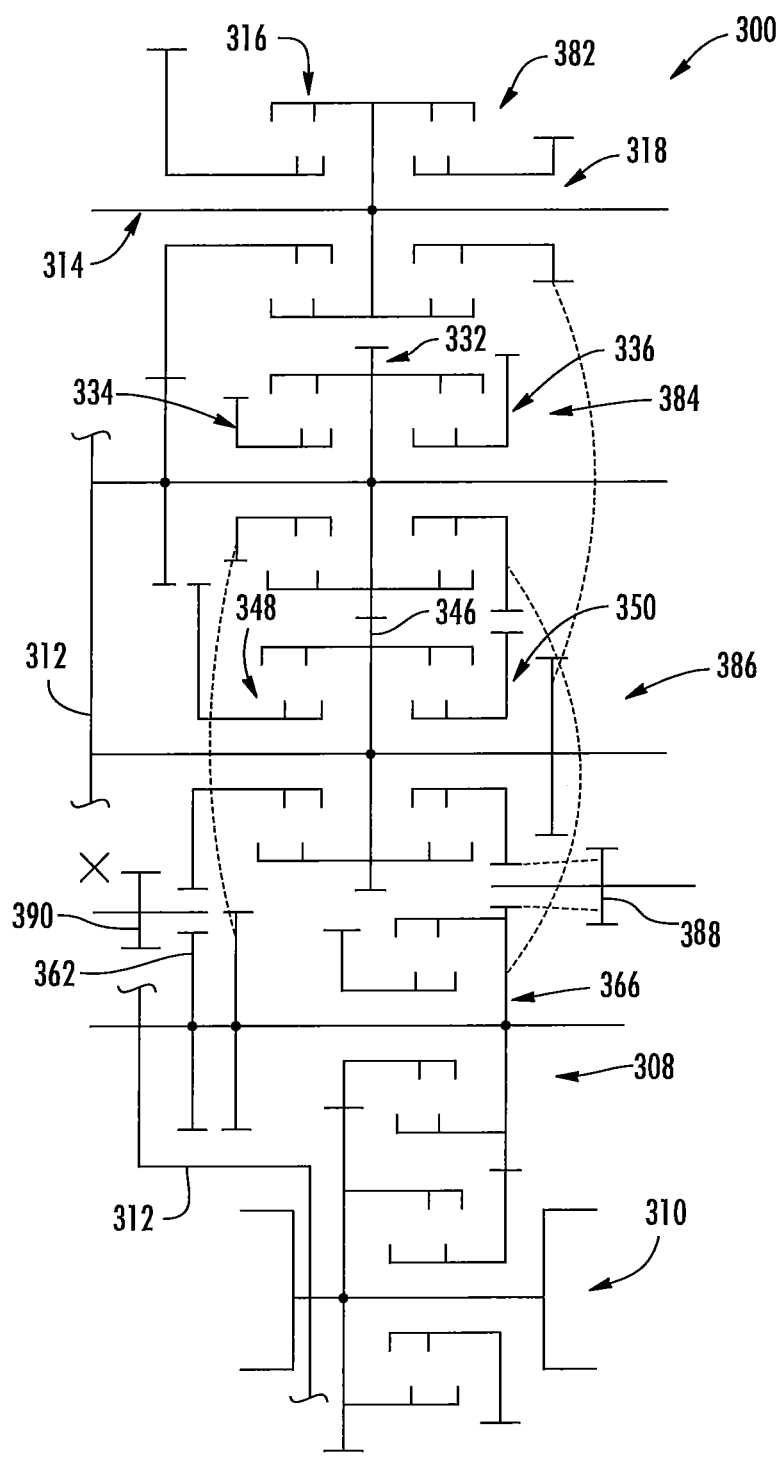
FIG. 3 is a schematic view of another preferred embodiment of a transmission.
Figure 4:
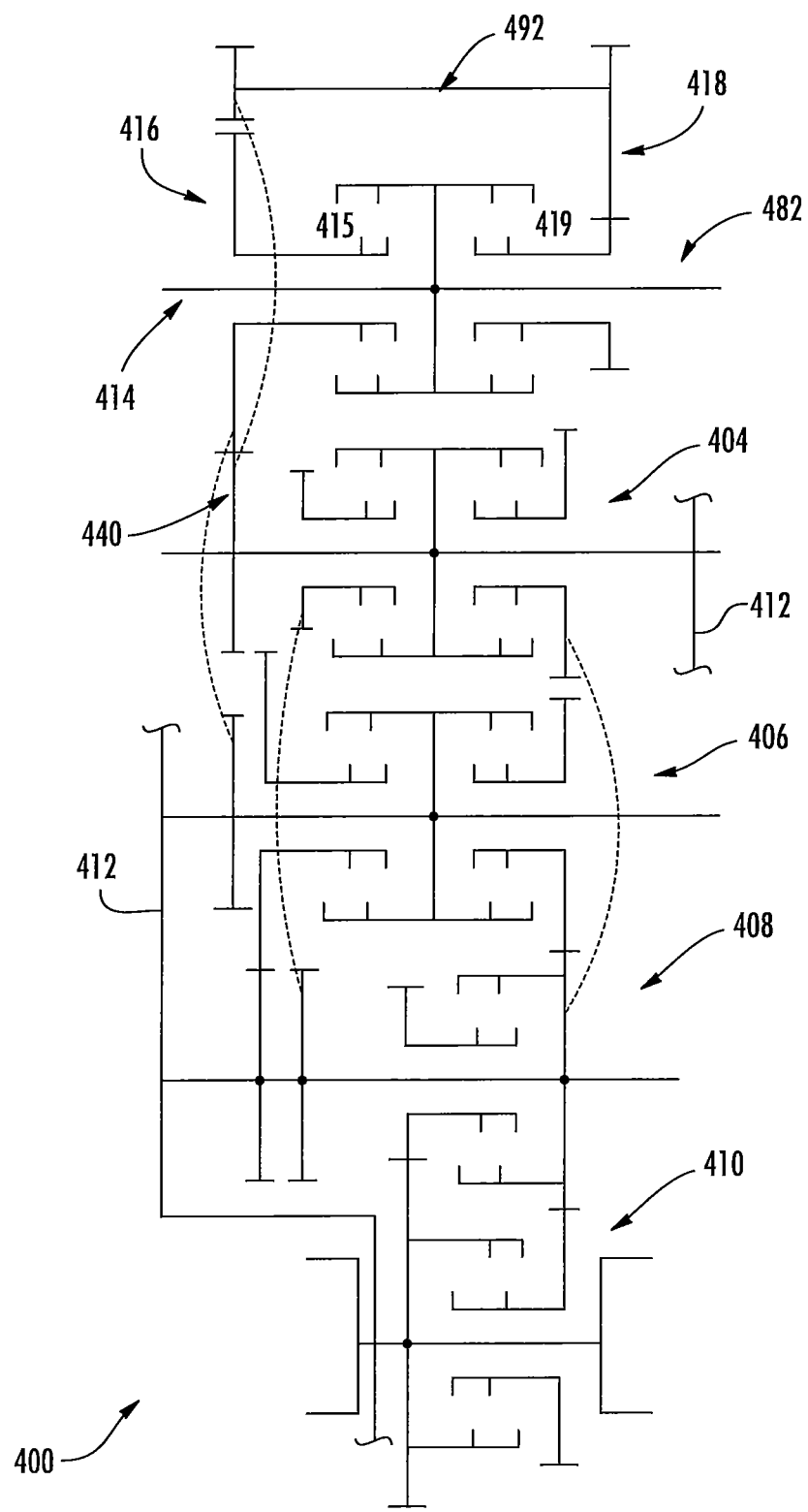
FIG. 4 is a schematic view of a preferred embodiment of a transmission.
Figure 5:
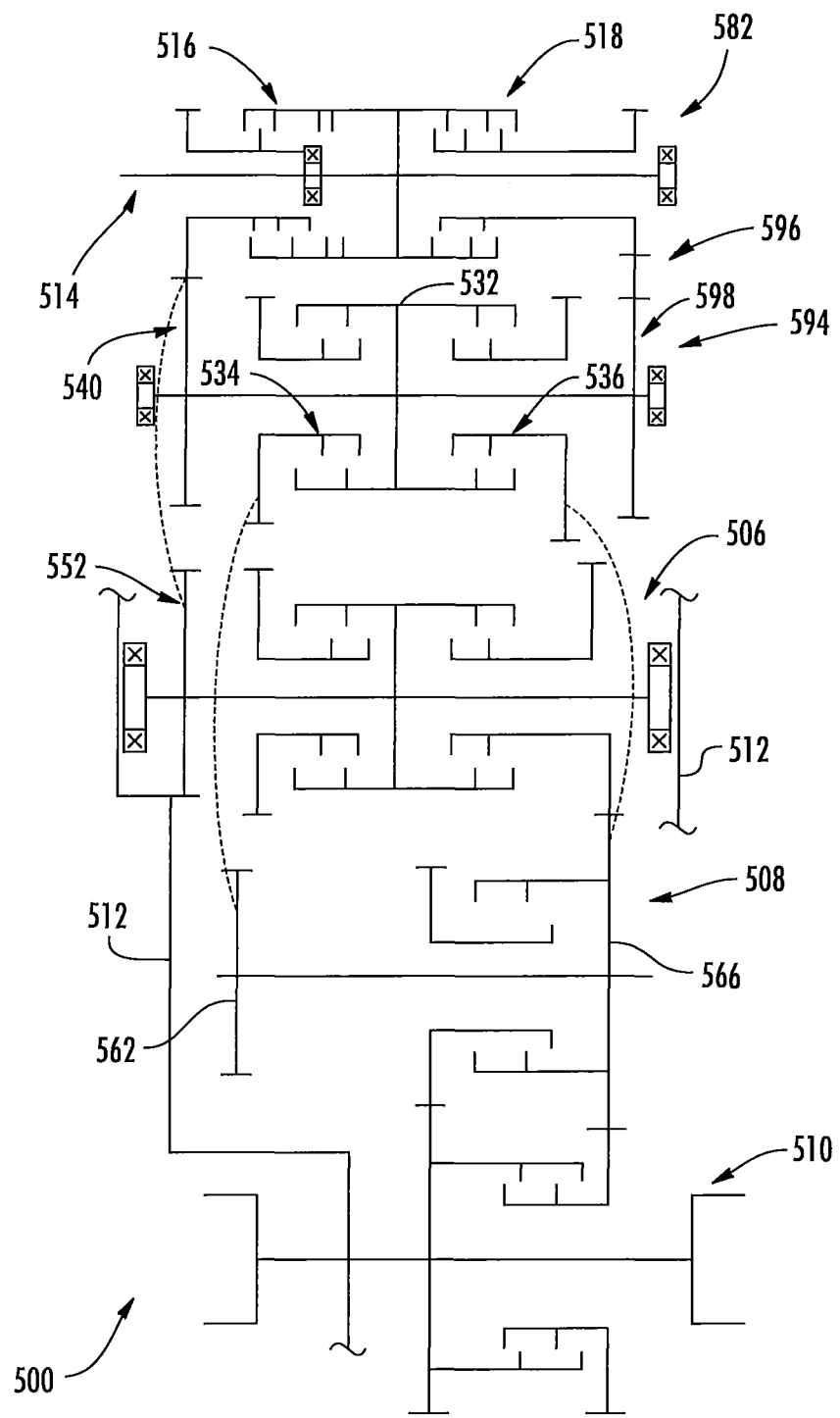
FIG. 5 is a schematic view of another preferred embodiment of a transmission.

Further, it is understood that the different and additional features of the variations of the embodiments shown in FIGS. 3-5 can be appreciated by one skilled in the art in view of FIGS. 3-5 and the transmissions 100, 200 illustrated in FIGS. 1 and 2, and that the variations of the embodiments shown in FIGS. 3-5 provide similar advantages and functionality.

FIG. 3 illustrates a transmission 300 according to another embodiment. The transmission 300 is a variation of the transmission 100, and has similar features thereto. The variation of the embodiments shown in FIG. 3 includes similar components to the transmission 100 illustrated in FIG. 1. Similar features of the variation shown in FIG. 3 are numbered similarly in series. Different and additional features of the variation shown in FIG. 3 can be appreciated by one skilled in the art in view of FIG. 3 and the transmission 100 illustrated in FIG. 1, and are described herein below.

The transmission 300 may be used with a vehicle designed for primary use in off-road situations, but it is understood that the transmission 300 may also be used in other applications. The transmission 300 includes an input and direction selection assembly 382, a first clutching assembly 384, a second clutching assembly 386, a pair of idler shafts 388, 390, a first range clutching assembly 308, and a second range clutching assembly 310. The input and direction selection assembly 382, the first clutching assembly 384, the second clutching assembly 386, the pair of idler shafts 388, 390, the first range clutching assembly 308, and the second range clutching assembly 310 are rotatably disposed within a transmission housing 312 (partially shown). A torque converter assembly (not shown) may be coupled to the transmission housing 312 and is in driving engagement with an input shaft of the input and direction selection assembly 382.

The input and direction selection assembly 382 is a clutch and gear assembly drivingly engaged with a power source (not shown) through an input shaft 314 and the first clutching assembly 384. The input and direction selection assembly 382 includes the input shaft 314, a first direction selection clutch assembly 316, and a second direction selection clutch assembly 318. The first direction selection clutch assembly 316 may be drivingly engaged the input shaft 314 and the first clutching assembly 384. The second direction selection clutch assembly 318 may be engaged the input shaft 314 and the second clutching assembly 386.

The first clutching assembly 384 is a clutch and gear assembly drivingly engaged with the input and direction selection assembly 382, the second clutching assembly 386, and the first range clutching assembly 308. The first clutching assembly 384 includes an input portion 332, a first gear selection portion 334, and a second gear selection portion 336. The input portion 332 is drivingly engaged with the first direction selection clutch assembly 316 and an input portion 346 of the second clutching assembly 386. The first gear selection portion 334 may be engaged to drivingly engage the input portion 332 and the first range clutching assembly 308. The second gear selection portion 336 may be engaged to drivingly engage the input portion 332 and the first range clutching assembly 308.

The second clutching assembly 386 is a clutch and gear assembly drivingly engaged with the input and direction selection assembly 382, the first clutching assembly 384, the idler shaft 388, and the idler shaft 390. The second clutching assembly 386 includes the input portion 346, a first gear selection portion 348, and a second gear selection portion 350. The input portion 346 is drivingly engaged with the input portion 332 of the first clutching assembly 384. The first gear selection portion 348 may be engaged to drivingly engage the input portion 346 and the idler shaft 390. The second gear selection portion 390 may be engaged to drivingly engage the input portion 332 and the idler shaft 388.

The idler shaft 390 is a gear and shaft assembly rotatably mounted within the transmission housing 312. The idler shaft 390 is in driving engagement with the first gear selection portion 348 of the second clutching assembly 386 and a first input gear 362 of the first range clutching assembly 308.

The idler shaft 388 is a gear and shaft assembly rotatably mounted within the transmission housing 312. The idler shaft 388 is in driving engagement with the second gear selection portion 350 of the second clutching assembly 386 and a third input gear 366 of the first range clutching assembly 308. The idler shafts 388, 390 ensure that the rotational direction of the output of the transmission is the same for every engaged clutch of the clutching assemblies 384, 386. The idler shafts 388, 390 allow the size of the gears in the transmission to decrease to allow for a more compact packaging.

FIG. 4 illustrates a transmission 400 according to another preferred embodiment. The transmission 400 is a variation of the transmission 100, and has similar features thereto. The variation of the embodiments shown in FIG. 4 includes similar components to the transmission 100 illustrated in FIG. 1. Similar features of the variation shown in FIG. 4 are numbered similarly in series. Different and additional features of the variation shown in FIG. 4 can be appreciated by one skilled in the art in view of FIG. 4 and the transmission 100 illustrated in FIG. 1, and are described herein below.

The transmission 400 may be used with a vehicle designed for primary use in off-road situations, but it is understood that the transmission 400 may also be used in other applications. The transmission 400 includes an input and direction selection assembly 482, a first clutching assembly 404, a second clutching assembly 406, a first range clutching assembly 408, a second range clutching assembly 410, and an idler shaft 492. The input and direction selection assembly 482, the first clutching assembly 404, the second clutching assembly 406, the first range clutching assembly 408, the second range clutching assembly 410, and the idler shaft 492 are rotatably disposed within a transmission housing 412 (partially shown). A torque converter assembly (not shown) may be coupled to the transmission housing 412 and is in driving engagement with an input shaft 414 of the input and direction selection assembly 482.

The input and direction selection assembly 482 is a clutch and gear assembly drivingly engaged with a power source (not shown) through the input shaft and the first clutching assembly 404. The input and direction selection assembly 482 includes the input shaft 414, a first direction selection clutch assembly 416, and a second direction selection clutch 416. The first direction selection clutch assembly 416 may be engaged to drivingly engage the input shaft 414 and the first clutching assembly 404. The second direction selection clutch 416 may be engaged to drivingly engage the input shaft and the idler shaft 492.

The idler shaft 492 is a gear and shaft assembly rotatably mounted within the transmission housing 412. The idler shaft 492 is in driving engagement with the second direction selection clutch assembly 418 of the input and direction selection assembly 482 and a geared radially extending portion 440 of the first clutching assembly 404. The idler shaft 492 ensures a different rotational direction of the geared radially extending portion 440 when a different clutch 415, 419 of the input direction selection clutch assembly 482 is selected. The idler shaft 492 allows the size of the gears in the transmission to decrease to allow for a more compact packaging.

FIG. 5 illustrates a transmission 500 according to another embodiment. The transmission 500 is a variation of the transmission 100, and has similar features thereto. The embodiment shown in FIG. 5 includes similar components to the transmission 100 illustrated in FIG. 1. Similar features of the variation shown in FIG. 5 are numbered similarly in series. Different and additional features of the variation shown in FIG. 5 can be appreciated by one skilled in the art in view of FIG. 5 and the transmission 100 illustrated in FIG. 1, and are described hereinbelow.

The transmission 500 may be used with a vehicle designed for primary use in off-road situations, but it is understood that the transmission 500 may also be used in other applications. The transmission 500 includes an input and direction selection assembly 582, a first clutching assembly 594, a second clutching assembly 506, a first range clutching assembly 508, a second range clutching assembly 510, and an idler shaft 596. The input and direction selection assembly 582, the first clutching assembly 594, the second clutching assembly 506, the first range clutching assembly 508, the second range clutching assembly 510, and the idler shaft 596 are rotatably disposed within a transmission housing 512 (partially shown). A torque converter assembly (not shown) may be coupled to the transmission housing 512 and is in driving engagement with an input shaft 514 of the input and direction selection assembly 582.

The input and direction selection assembly 582 is a clutch and gear assembly drivingly engaged with a power source (not shown) through the input shaft 514 and the first clutching assembly 594. The input and direction selection assembly 582 includes the input shaft 514, a first direction selection clutch assembly 516, and a second direction selection clutch assembly 518. The first direction selection clutch assembly 516 may be engaged to drivingly engage the input shaft 514 and the first clutching assembly 594. The second direction selection clutch 516 may be engaged to drivingly engage the input shaft 514 and the first clutching assembly 594 through the idler shaft 596, reversing a direction of rotation.

The first clutching assembly 594 is a clutch and gear assembly drivingly engaged with the input and direction selection assembly 582, the second clutching assembly 506, the first range clutching assembly 508, and the idler shaft 596. The first clutching assembly 594 includes an input portion 532, a first gear selection portion 534, and a second gear selection clutch 536. The input portion 532 includes a first geared end 540 drivingly engaged with the first direction selection clutch assembly 516 of the input and direction selection assembly 582 and a geared radially extending portion 552 of the second clutching assembly 506. The input portion 532 also includes a second geared end 598 drivingly engaged with the idler shaft 596. The first gear selection portion 534 may be engaged to drivingly engage the input portion 532 and a first input gear 562 of the first range clutching assembly 508. The second gear selection portion 536 may be engaged to drivingly engage the input portion 514 and a third input gear 566 of the first range clutching assembly 508.

The idler shaft 596 is a gear and shaft assembly rotatably mounted within the transmission housing 512. The idler shaft 596 is in driving engagement with the second direction selection clutch 518 of the input and direction selection assembly 582 and the second geared end 598 of the first clutching assembly 594. The idler shaft 596 ensures that the rotational direction of the output of the transmission is opposite depending on whether the first direction selection clutch assembly 516 or the second direction selection clutch assembly 518 is selected in the input and direction selection assembly 582.

The idler shaft 596 also allows the size of the gears in the transmission to decrease to allow for a more compact packaging.

Provided herein is a vehicle including the transmission any one of the embodiments disclosed herein.

Provided herein is a method including providing a transmission having any one of the embodiments disclosed herein.

It is understood that the size of the gears included in the above embodiments can include gears of the same size or various sizes. By changing the size of the gears, the gear ratios provided by the transmission are adjustable.

It is to be understood that the above description is intended to be illustrative, and not limiting. Many embodiments will be apparent to those of skill in the art upon reading the above description. The scope of the embodiments should be determined, however, not with reference to the above description, but with reference to the appended claims and the full scope of equivalents to which the claims are entitled by law. Numerous variations, changes, and substitutions will now occur to those skilled in the art without departing from the preferred embodiments. It is intended that the following claims define the scope of the preferred embodiments and that methods and structures within the scope of these claims and their equivalents be covered thereby.

What is claimed:

1. A transmission comprising:
an input and direction selection assembly comprising:
an input shaft, a first direction selection clutch assembly having a clutch and a geared output portion,
a second direction selection clutch assembly having a clutch, and
a reversing gear in driving engagement with the second direction selection clutch and the input shaft,
wherein the first direction selection clutch selectively engages the input shaft and the geared output portion of the first direction selection clutch assembly, and
wherein the second direction selection clutch selectively engages the geared output of the first direction selection clutch assembly and the reversing gear;
a first clutching assembly including an input portion, a first gear selection portion and a second gear selection portion;
a second clutching assembly including an input portion, a third gear selection portion and a fourth gear selection portion;
a first range clutching assembly including a geared input portion and a range selection portion;
a second range clutching assembly including an output shaft portion and a range selection portion; and
a housing,
wherein the first clutching assembly is selectively drivingly engaged with the input and direction selection assembly and the first range clutching assembly,
wherein the second clutching assembly is selectively drivingly engaged with the input and direction selection assembly through the geared output portion, and
wherein the first range clutching assembly is selectively drivingly engaged with the second clutching assembly and the second range clutching assembly.

2. The transmission of claim 1, wherein the input and direction selection assembly, the first clutching assembly, the second clutching assembly, the first range clutching assembly and the second range clutching assembly are rotatably disposed inside the housing.

3. The transmission of claim 1, further comprising a torque converter assembly coupled to the housing and in driving engagement with the input shaft.

4. The transmission of claim 1, wherein the first direction selection clutch and the second direction clutch are plate-style clutches.

5. The transmission of claim 1, wherein the first gear selection portion, the second gear selection portion, the third gear selection portion and the fourth gear selection portion are plate-style clutches.

6. The transmission of claim 1, wherein the geared output portion of the first direction selection clutch assembly is positioned axially between the first and second gear selection portions.

7. A transmission comprising:
an input and direction selection assembly comprising:
an input shaft,
a first direction selection clutch assembly having a clutch and a geared output portion, and
a second direction selection clutch assembly having a clutch,
wherein the first direction selection clutch selectively engages the input shaft and the geared output portion and
wherein the second direction selection clutch selectively engages the input shaft;
a first clutching assembly including an input portion, a first gear selection portion and a second gear selection portion;
a second clutching assembly including an input portion, a third gear selection portion and a fourth gear selection portion;
a first range clutching assembly including a geared input portion and a range selection portion;
a second range clutching assembly including an output shaft portion and a range selection portion; and
a housing,
wherein the first clutching assembly is selectively drivingly engaged with the input and direction selection assembly through the geared output portion and the second clutching assembly,
wherein the second clutching assembly is selectively drivingly engaged with the input and direction selection assembly, and
wherein the first range clutching assembly is selectively drivingly engaged with the first clutching assembly, the second clutching assembly and the second range clutching assembly.

8. The transmission of claim 7, further comprising an idler shaft in driving engagement with the second direction selection clutch assembly, wherein the second direction selection clutch selectively engages the input shaft and the idler shaft.

9. The transmission of claim 8, wherein the second clutching assembly is selectively drivingly engaged with the input and direction selection assembly through first clutching assembly and the idler shaft.

10. The transmission of claim 7, further comprising a first idler shaft and a second idler shaft, wherein the first idler shaft is selectively engaged with the second clutching assembly and the first range clutching assembly and the second idler shaft is selectively engaged with the second clutching assembly and the first clutch range assembly.

11. The transmission of claim 10, wherein the second clutching assembly is selectively drivingly engaged with the input and direction selection assembly through the second direction selection clutch assembly.

12. The transmission of claim 7, wherein the input and direction selection assembly, the first clutching assembly, the second clutching assembly, the first range clutching assembly and the second range clutching assembly are rotatably disposed inside the housing.

13. The transmission of claim 12 further comprising a torque converter assembly coupled to the housing and in driving engagement with the input shaft.

14. The transmission of claim 7, wherein the first direction selection clutch and the second direction clutch are plate-style clutches.

15. The transmission of claim 7, wherein the first gear selection portion, the second gear selection portion, the third gear selection portion and the fourth gear selection portion are plate-style clutches.

16. A transmission comprising:
an input and direction selection assembly comprising:
an input shaft,
a first direction selection clutch assembly having a clutch and a geared output portion, and
a second direction selection clutch assembly having a clutch;
a first clutching assembly including an input portion, a first gear selection portion and a second gear selection portion;
a second clutching assembly including an input portion, a third gear selection portion and a fourth gear selection portion;
a first range clutching assembly including a geared input portion and a range selection portion;

a second range clutching assembly including an output shaft portion and a range selection portion;

an idler shaft; and a housing, wherein the first direction selection clutch selectively engages the input shaft and the first clutching assembly, wherein the second direction selection clutch selectively engages the input shaft and the first clutching assembly through the idler shaft, wherein the first clutching assembly is selectively drivingly engaged with the first range clutching assembly, and wherein the first range clutching assembly is selectively drivingly engaged with the second clutching assembly and the second range clutching assembly.

17. The transmission of claim 16, wherein the input and direction selection assembly, the first clutching assembly, the second clutching assembly, the first range clutching assembly and the second range clutching assembly are rotatably disposed inside the housing.

18. The transmission of claim 17 further comprising a torque converter assembly coupled to the housing and in driving engagement with the input shaft.

19. The transmission of claim 16, wherein the first direction selection clutch, the second direction clutch are plate-style clutches.

20. The transmission of 16, wherein the first gear selection portion, second gear selection portion, third gear selection portion and fourth gear selection portion are plate-style clutches.

* * * * *